Figure 1:
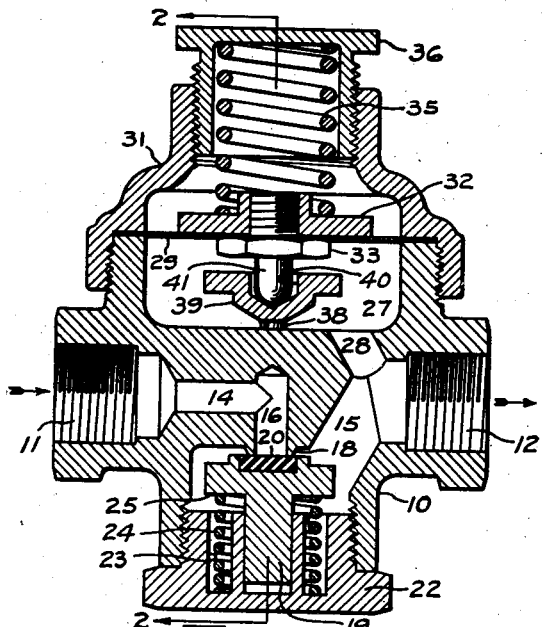

Sept. 30, 1941.    P. C. TEMPLE    2,257,204
PRESSURE REDUCING AND REGULATING VALVE
Filed Dec. 30, 1938

Inventor

PAUL C. TEMPLE

By Albert G. Blodgett
Attorney

Patented Sept. 30, 1941

2,257,204

UNITED STATES PATENT OFFICE 2,257,204

PRESSURE REDUCING AND REGULATING VALVE

Paul C. Temple, Decatur, Ill., assignor to A. W. Cash Company, Decatur, Ill., a corporation of Delaware Application December 30, 1938, Serial No. 248,555

1 Claim. (Cl. 50—23)

This invention relates to pressure reducing and regulating valves, and more particularly to a valve which will function automatically to maintain the fluid on the discharge side thereof at a substantially constant predetermined pressure.

One object of the invention is to provide a pressure reducing and regulating valve which will be of very compact construction and simple and inexpensive to manufacture.

A further object of the invention is to provide a pressure reducing and regulating valve which will be free from all tendency to chatter, and which will operate smoothly and reliably at all times.

With these and other objects in view, as will be apparent to those skilled in the art, the invention resides in the combination of parts set forth in the specification and covered by the claim appended hereto.

Figure 2:
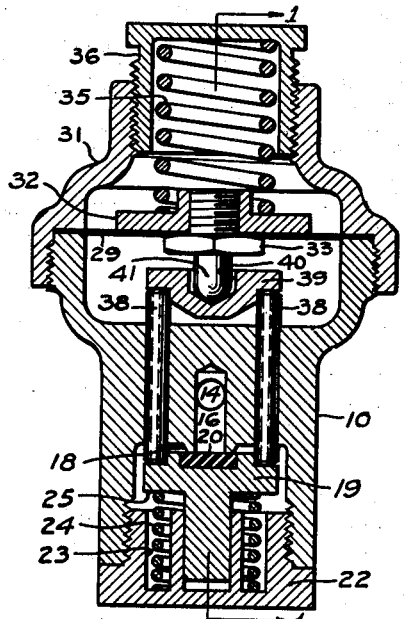

Referring to the drawing illustrating one embodiment of the invention, and in which like reference numerals indicate like parts:

Fig. 1 is a section through a pressure reducing and regulating valve, the section being taken on the line 1—1 of Fig. 2; and Fig. 2 is a section on the line 2—2 of Fig. 1.

The valve illustrated comprises a hollow body or casing 10 having an inlet opening 11 and an outlet opening 12 to which suitable pipes (not shown) may be connected. These openings are located in alignment with each other and on opposite sides of the valve body. An inlet chamber 14 communicates with the inlet 11, and an outlet chamber 15 communicates with the outlet 12. The outlet chamber extends beneath the inlet chamber, and these chambers communicate through a downwardly-directed port 16 surrounded at its lower end by an annular valve seat 18. A vertically slidable valve member 19 is located beneath the valve seat to control the flow through the port 16, this valve member having a disk 20 mounted in its upper face to engage the valve seat. The valve member 19 is slidably supported in a plug 22 which is screw-threaded into the bottom of the valve body 10. This plug 22 is formed with an annular recess 23 in which there is mounted a coiled compression spring 24, the upper end of the spring engaging a shoulder 25 on the valve member. The spring 24 is sufficiently powerful to hold the valve member in its uppermost or closed position against the pressure of the fluid in the inlet chamber 14, in the absence of other opposing forces.

The valve body 10 is recessed at the top to provide a diaphragm chamber 27 which communicates through a port 28 with the outlet chamber 15. The upper wall of this diaphragm chamber is formed by a substantially flat flexible diaphragm 29 having its marginal portion clamped against the valve body 10 by means of a screw-threaded cap 31. The central portion of the diaphragm is secured to a pressure-plate 32 thereabove by means of a screw 33. A coiled compression spring 35 engages the pressure-plate 32 to urge the same downwardly, the upper end of this spring being supported in a hollow adjustable plug 36 screw-threaded into the cap 31.

The diaphragm 29 is connected to the valve member 19 by a mechanism comprising a pair of independent parallel vertical compression rods 38 slidably mounted in the valve body 10 on opposite sides of the valve seat 18. The upper ends of the rods 38 extend into the diaphragm chamber 27, and their lower ends extend into the outlet chamber 15. The connecting mechanism also comprises a device arranged to equalize the forces transmitted by the two rods and thereby avoid any tendency to tip the valve member and cause it to bind in its guideway. In the valve illustrated the equalizing device is shown as a member 39 located in the diaphragm chamber 27 and loosely engaging the upper ends of the rods. This member 39 is formed with a recess 40 in the center of its upper surface to receive a small rounded protuberance 41 extending downwardly from the screw 33. This protuberance is located midway between the two rods 38, and since the member 39 is free to rock thereon the forces transmitted by the rods will be equalized. Hence the valve member 19 will slide freely in the plug 22 without binding.

It will now be apparent that in the normal operation of the valve the spring 35 will transmit a sufficient compressive force through the rods 38 to hold the valve member 19 partially open against the upward force of the spring 24, and the rate of fluid flow through the valve will be just sufficient to maintain a desired pressure in the outlet chamber 15. If for any reason the outlet pressure should increase slightly, this increased pressure will force the diaphragm 29 upwardly against the resistance of the spring 35, and at the same time the spring 24 will move the valve member 19 upwardly toward its seat 18, restricting the fluid flow and restoring the desired outlet pressure. Similarly, if the outlet pressure effective on the diaphragm 29 should decrease slightly, the spring 35 will move the diaphragm downwardly, and the rods 38 will move the valve member 19 downwardly away from its seat 18 until the desired outlet pressure is restored. During the movements of the diaphragm the valve member 19 will slide freely in the plug 22 without any tendency toward lateral tipping, for the compressive forces transmitted by the rods 38 will be equalized by the action of the member 39. The valve will therefore operate smoothly and accurately at all times.

The invention is very simple and compact, and can be manufactured at comparatively low cost. All working parts are readily accessible for inspection or replacement without removing the valve body from the line. The valve member can be depended upon to slide freely in its guideway, and since this valve member closes against the pressure in the inlet chamber there will be no tendency for it to chatter in operation.

Having thus described my invention, what I claim as new and desire to secure by Letters Patent is:

A pressure reducing and regulating valve comprising a body shaped to provide an inlet chamber, an outlet chamber and a port connecting said chambers, an annular valve seat at the discharge end of the port, a valve member slidably mounted adjacent the valve seat to control the flow through the port, a spring urging the valve member toward the seat, a flexible diaphragm subjected to the fluid pressure in the outlet chamber, a spring urging the diaphragm in opposition to said fluid pressure, two parallel compression rods slidably mounted in the valve body on opposite sides of the valve seat with one end of each rod rockably engaging the valve member, a protuberance on the diaphragm midway between the rods, and a member connecting the protuberance with the adjacent ends of the rods, the member being loosely connected to the rods and arranged to rock on the protuberance as may be required to equalize the compression forces transmitted by the rods.

PAUL C. TEMPLE.